(12) United States Patent
Karakotsios et al.

(10) Patent No.: US 9,355,301 B2
(45) Date of Patent: *May 31, 2016

(54) ENHANCED FACE RECOGNITION IN VIDEO

(71) Applicant: Amazon Technologies, Inc., Reno, NV (US)

(72) Inventors: Kenneth M. Karakotsios, San Jose, CA (US); Kah Kuen Fu, Sunnyvale, CA (US); Volodymyr V. Ivanchenko, Mountain View, CA (US); Mingjing Huang, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/552,378

(22) Filed: Nov. 24, 2014

(65) Prior Publication Data
US 2015/0078623 A1 Mar. 19, 2015

Related U.S. Application Data

(60) Continuation of application No. 14/151,717, filed on Jan. 9, 2014, now Pat. No. 8,897,510, which is a division of application No. 13/158,328, filed on Jun. 10, 2011, now Pat. No. 8,705,812.

(51) Int. Cl.
G06K 9/00 (2006.01)
(52) U.S. Cl.
CPC .......... G06K 9/00255 (2013.01); G06K 9/0061 (2013.01); G06K 9/00228 (2013.01)
(58) Field of Classification Search
CPC ............ G06K 9/00255; G06K 9/0061; G06K 9/00228
See application file for complete search history.

(56) References Cited

U.S. PATENT DOCUMENTS

| 6,665,426 | B1 * | 12/2003 | Kim .............................. 382/117 |
| 6,920,236 | B2 | 7/2005 | Prokoski |
| 7,113,201 | B1 | 9/2006 | Taylor et al. |
| 7,324,664 | B1 | 1/2008 | Jouppi et al. |
| 7,634,662 | B2 | 12/2009 | Monroe |
| 7,885,531 | B2 | 2/2011 | Kim et al. |

(Continued)

FOREIGN PATENT DOCUMENTS

| EP | 2718871 | 4/2014 |
| JP | 2004-252511 | 9/2004 |

(Continued)

OTHER PUBLICATIONS

Notice of Allowance dated Jul. 18, 2014; 10 pages.

(Continued)

Primary Examiner — Gregory M Desire
(74) Attorney, Agent, or Firm — Polsinelli LLP

(57) ABSTRACT

The computational resources needed to perform processes such as image recognition can be reduced by determining appropriate frames of image information to use for the processing. In some embodiments, infrared imaging can be used to determine when a person is looking substantially towards a device, such that an image frame captured at that time will likely be adequate for facial recognition. In other embodiments, sound triangulation or motion sensing can be used to assist in determining which captured image frames to discard and which to select for processing based on any of a number of factors indicative of a proper frame for processing.

21 Claims, 6 Drawing Sheets

(56) References Cited

U.S. PATENT DOCUMENTS

| | | | |
|---|---|---|---|
| 8,254,633 B1 | 8/2012 | Moon et al. | |
| 8,509,484 B2 | 8/2013 | Ikenoue | |
| 8,599,266 B2 | 12/2013 | Trivedi et al. | |
| 8,614,676 B2 | 12/2013 | Chiang | |
| 8,670,048 B2 | 3/2014 | Sugino et al. | |
| 8,705,812 B2 | 4/2014 | Karakotsios et al. | |
| 8,767,082 B2 | 7/2014 | Thorn | |
| 8,897,510 B2 | 11/2014 | Karakotsios et al. | |
| 2002/0131622 A1 | 9/2002 | Lee et al. | |
| 2003/0053664 A1 | 3/2003 | Pavlidis et al. | |
| 2006/0104488 A1* | 5/2006 | Bazakos | G06K 9/00255 382/118 |
| 2007/0110422 A1 | 5/2007 | Minato et al. | |
| 2008/0152199 A1 | 6/2008 | Oijer | |
| 2008/0297588 A1 | 12/2008 | Kurtz et al. | |
| 2010/0189358 A1 | 7/2010 | Kaneda et al. | |
| 2010/0246905 A1 | 9/2010 | Yuasa et al. | |
| 2010/0295769 A1 | 11/2010 | Lundström | |
| 2011/0019924 A1 | 1/2011 | Elgersma et al. | |
| 2011/0090303 A1 | 4/2011 | Wu et al. | |
| 2011/0298829 A1 | 12/2011 | Stafford et al. | |
| 2012/0026338 A1 | 2/2012 | Chuang et al. | |
| 2012/0133754 A1 | 5/2012 | Lee et al. | |
| 2012/0295708 A1 | 11/2012 | Hernandez-Abrego et al. | |
| 2012/0314914 A1 | 12/2012 | Karakotsios | |
| 2013/0070973 A1 | 3/2013 | Saito et al. | |
| 2014/0376789 A1* | 12/2014 | Xu | G06T 5/003 382/128 |
| 2015/0078623 A1* | 3/2015 | Karakotsios et al. | 382/103 |

FOREIGN PATENT DOCUMENTS

| | | |
|---|---|---|
| JP | 2005-227957 | 8/2005 |
| JP | 2006-251266 | 9/2006 |
| JP | 2008-199549 | 8/2008 |
| JP | 2009-017030 | 1/2009 |
| JP | 2010-231350 | 10/2010 |
| JP | 2014-519665 | 8/2014 |
| WO | WO 2010/116715 | 10/2010 |
| WO | WO 2012/170803 | 12/2012 |

OTHER PUBLICATIONS

Notice of Allowance dated Oct. 9, 2013; 10 pages.

International Search Report and Written Opinion issued in Corresponding PCT Application No. PCT/US12/41531 dated Aug. 10, 2012.

Partial Supplementary Search Report, mailed Dec. 4, 2014, 7 pages, for European Patent Application 12797673.6, filed on Jun. 8, 2012.

Extended European Search Report, mailed Mar. 26, 2015, 9 pages, for European Patent Application 12797673.6, filed on Jun. 8, 2012.

Han, Song-Yi, et al., "Face Recognition Based on Near-Infrared Light Using Mobile Phone," Adaptive and Natural Computing Algorithms, Lecture Notes in Computer Science, Apr. 11, 2007, pp. 440-448.

Yang, Zhiguang, et al., "Face Pose Estimation and its Application in Video Shot Selection," Proceedings of the 17$^{th}$ International Conference on Pattern Recognition (ICPR'04), Aug. 2004, 4 pages, The Computer Society.

Zhu, Zhiwei, et al., "Robust real-time eye detection and tracking under variable lighting conditions and various face orientations," Apr. 2005, pp. 124-154, Computer Vision and Image Understanding, Academic Press.

* cited by examiner

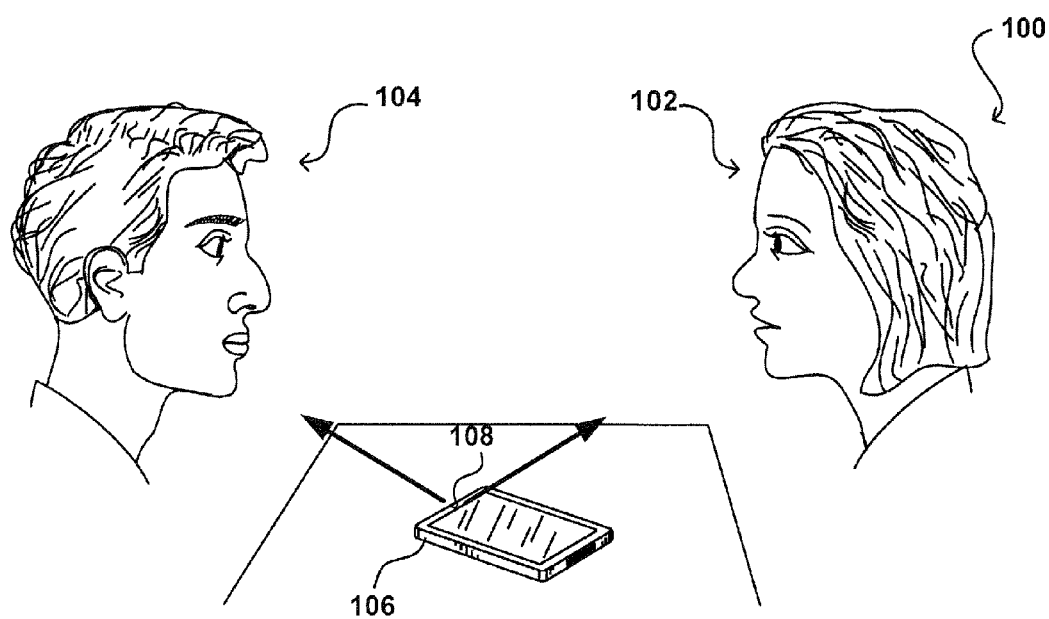
FIG. 1
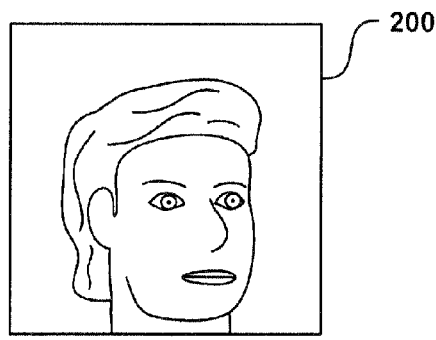 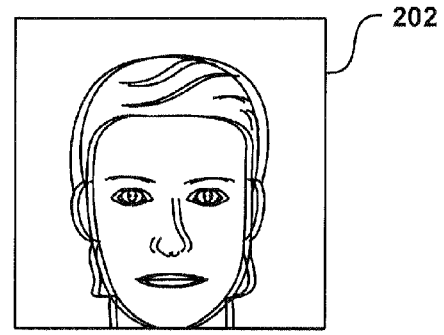
FIG. 2(a)　　　　　　　FIG. 2(b)

ENHANCED FACE RECOGNITION IN VIDEO

CROSS REFERENCE TO RELATED APPLICATION

This application is a Continuation of, and claims priority to, U.S. patent application Ser. No. 14/151,717, entitled "Enhanced Face Recognition in Video" filed on Jan. 9, 2014, and is issuing as U.S. Pat. No. 8,897,510 on Nov. 25, 2014, which is a Divisional of, and claims priority to, U.S. patent application Ser. No. 13/158,328, entitled "Enhanced Face Recognition in Video" filed with the U.S. Patent and Trademark Office on Jun. 10, 2011 (now U.S. Pat. No. 8,705,812), each of which are incorporated herein by reference for all purposes.

BACKGROUND

As the variety of available computing devices increases, as well as the variety of tasks for which these devices are used, there comes a need to adapt the ways in which users interface with these devices. In many instances, it is desirable to recognize or validate the identity of a person to a computing device, for purposes such as security or personalization. Certain devices include video cameras that can be used to capture image information. Analyzing video information can be very processor and power intensive, such that it can be desirable instead to analyze only certain portions of the captured video. In many instances, however, the user will not be looking directly at the camera or there will be motion blur, such as may result from movement of the user or the computing device (e.g., a tablet computer or smart phone). The selection of random video frames thus can lead to additional capture and analysis until a suitable frame is selected, which can result in unnecessary delay and resource utilization, among other issues.

BRIEF DESCRIPTION OF THE DRAWINGS

Various embodiments in accordance with the present disclosure will be described with reference to the drawings, in which:

FIG. 1 illustrates an example situation wherein a computing device is capturing image information including persons near the device to provide input in accordance with various embodiments;

FIGS. 2(a) and 2(b) illustrate examples of images that can be captured when selecting frames at random from a captured video feed;

DETAILED DESCRIPTION

Figure 3A:
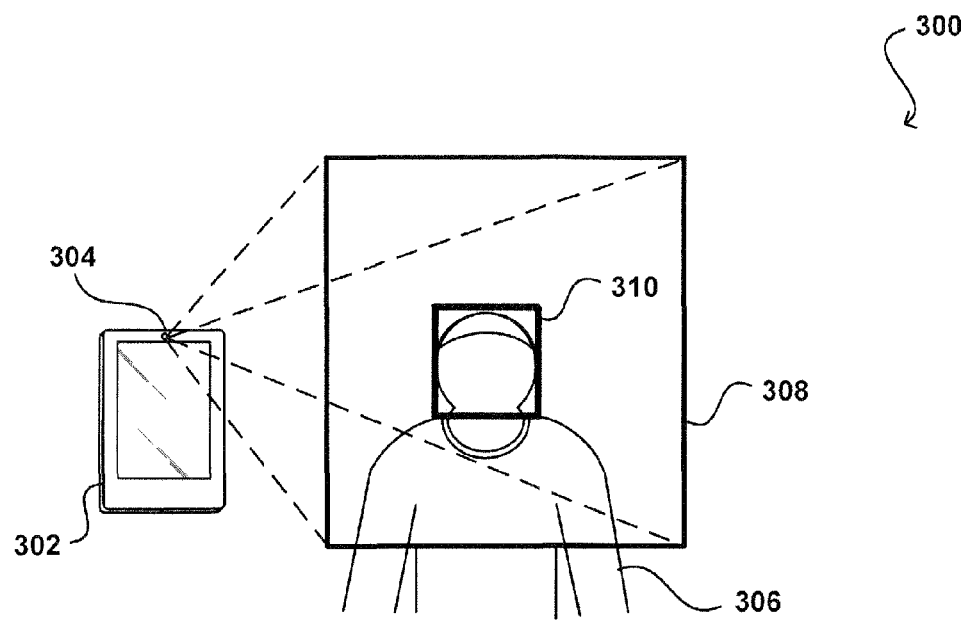
FIGS. 3(a)-3(d) illustrate an example situation wherein at least one camera of a device can capture video information about a user and determine an approximate head position, after which an imaging approach can be used to determine a relative orientation of the user's face in accordance with one embodiment.

Systems and methods in accordance with various embodiments of the present disclosure may overcome one or more of the aforementioned and other deficiencies experienced in conventional approaches to providing input to a computing device. In particular, approaches discussed herein enable a computing device to select one or more frames or other image portions from a video feed or other image stream to be used for purposes such as facial recognition. The ability to select frames with certain aspects or features can increase the likelihood that a selected frame will be suitable for processing, which can reduce the amount of resources needed to obtain a desired result using the video feed In one embodiment, a video feed is continually analyzed using a head or face detection algorithm. In other embodiments, the video feed and/or analysis might be started in response to a specific action or event, such as a motion detector or light sensor detecting motion nearby or an accelerometer detecting motion of a computing device. Once a face or head is detected, the device can utilize a relative orientation-determining algorithm to attempt to determine whether the person corresponding to the detected face is facing substantially towards the camera. In response to a determination that the person is facing substantially towards the camera, a corresponding frame of the video can be selected for processing, such as to perform facial recognition on the portion of the image frame corresponding to the user's head.

In one embodiment, at least one infrared (IR) transmitter and receiver (or transceiver) can emit IR radiation from the computing device and detect IR radiation reflected from the user. If the user is facing at least partially towards the device, the reflected IR may include regions of different intensity corresponding to locations of the user's pupils (or other features of the user's eyes). As known in the art, the human eye reflects certain IR wavelengths differently than the rest of a human's face, such that the pupils can quickly and easily be located using the reflected IR. In some embodiments, detecting two pupils might be enough to select that frame as a candidate for processing. In other embodiments, the device can determine whether the user is facing substantially towards the device by analyzing one or more aspects of the pupils in the detected image information.

In some embodiments, other approaches can be used to determine whether the user is likely facing substantially towards the device. For example, a device having at least two microphones or other audio capture elements can use differences in time of arrival of audio spoken by a person to determine whether the user is likely facing substantially towards the device. In another example, a device can enable a user to squeeze or otherwise provide input to a device when the user is facing substantially towards the device in order to manually activate image analysis, such as may be used to securely unlock the device. Still other embodiments can determine that the user is likely facing the device when the user is performing certain actions with respect to the device, such as typing on a touch screen or moving a cursor on an interface. As long as the user is substantially facing the device, any tilting or rotation of the user's head in the plane of the image (still facing the device) can be acceptable. Rotations such as tilting a user's head down, back, or to the side, however, where the user is no longer facing substantially towards the device, can reduce the accuracy of, or even prevent, facial recognition. If one considers three axes of rotation x, y, and z, where x runs right to left, y runs up and down, and z runs in and out with respect to the plane of the image and/or device, rotations about z are acceptable as the rotation can be removed and/or accounted for in the image, but rotations around x or y can be problematic for image recognition.

Many other alternatives and variations are described and suggested below in relation to at least some of the various embodiments.

FIG. 1 illustrates an example situation 100 wherein a computing device 106 includes at least one image capture element 108 that is able to capture image information over a range of angles around the device. Although a portable computing device (e.g., a cell phone, an electronic book reader, or tablet computer) is shown, it should be understood that any electronic device capable of receiving and processing input, or at least capable of rendering and/or displaying visual content, can be used in accordance with various embodiments discussed herein. Example devices can also include, for example, desktop computers, notebook computers, personal data assistants, smart phones, video gaming consoles, television set top boxes and portable media players.

In this example, there are two persons 102, 104 near the device. For many applications, it can be desirable to determine an identity of one or more persons for any of a number of purposes, such as to provide secure access to features on the device or record information about people in a meeting, etc. If the device 106 has at least one camera with a sufficient angular capture range, the device can attempt to identify the identity of any person at least partially contained in the image information. In devices with a single camera on a front or back of the device, this might include image information for a single user on one side of the device. For devices with wide angle lenses or multiple cameras, the device can concurrently capture information about multiple people or objects within a given range of the device, and can attempt to determine an identity of each of those people or objects.

Different computing devices can have different types of image capture element. For example, some devices might have digital still cameras that are able to capture single images at specific points in time, or digital video cameras that are able to continuously capture image information, which can be referred to as a set of frames in at least some embodiments. For a process such as image recognition to be relatively accurate, the image being analyzed typically has to meet some minimum criteria. This can include, for example, adequate lighting and contrast, but can also include factors such as the direction the person is facing in the image and the quality of focus of the image. For example, FIG. 2(a) illustrates an example image 200 wherein the person in the image is facing at an angle with respect to the image, or is not at an orientation where the user is facing substantially towards the image capture element. Such orientation can occur when, for example, images are captured at random or otherwise without prior analysis of the orientation. Similar issues can arise when selecting a frame from a video stream unless there is some processing of the video stream. To analyze each frame of video, or capture a large number of still images, can require a significant amount of processing, which can be undesirable in particular for portable devices which typically have limited available resources and battery life. Capturing an image with the person at an angle as in FIG. 2(a), however, can result in an image that cannot accurately be analyzed using a conventional facial recognition algorithm, as such algorithms typically require the user to be facing substantially towards the image capture element when the image is captured, to within a limited range such as plus or minus twenty degrees from normal.

Similarly, the image in FIG. 2(b) might not produce accurate results for a facial recognition process due at least in part to an amount of motion blur in the image 202. Blur can result, for example, from motion of the user during the image capture, or motion of the device while capturing the image. Blur can also occur due to other factors, such as improper focusing of the imaging element, or lenses associated with the element. Any of a number of other issues can exist as well that can prevent randomly selected images from being able to be accurately processed by a facial recognition or other image processing algorithm.

Systems and methods in accordance with various embodiments utilize one or more additional inputs to attempt to determine a time in which a frame of image information would likely produce adequate results for any of a number of image processing algorithms. The additional inputs can be obtained using elements or components that require a relatively low amount of power and/or processing, and that can be activated as appropriate based upon any of a number of different factors.

For example, FIG. 3(a) illustrates an example situation 300 wherein a person 306 is standing within the viewable range 308 of an image capture element 304 of a computing device 302. In some embodiments, the image capture element 304 can be a video capture element capable of capturing a substantially continuous stream of image information, at least over a specified period of time. As discussed, it can be very resource intensive to process the entire video stream using facial recognition algorithms or other such processes. An approach in accordance with certain embodiments instead uses a less robust algorithm, such as an algorithm that utilizes relations in subsequent frames or monitors a subset of determined local features, to attempt to identify the presence of a person's head or other such feature in the image stream. For example, in FIG. 3(a) an algorithm can look for a contour or shape that matches the shape of a human head within a specified level or range of certainty. Upon detecting such a shape or contour, the device can track a relative position or area 310 in the captured image information corresponding to the person's head. Approaches for detecting and tracking shapes or contours are known in the art and as such will not be discussed herein in detail. Further, while tracking is being performed and a tracked item remains in the captured image information, a determination process need not be performed. For example, once the position of a person's head is determined, that feature can be tracked without having to re-determine that the feature is a person's head (unless the head is out of the image for a minimum amount of time, etc.

Figure 3B:
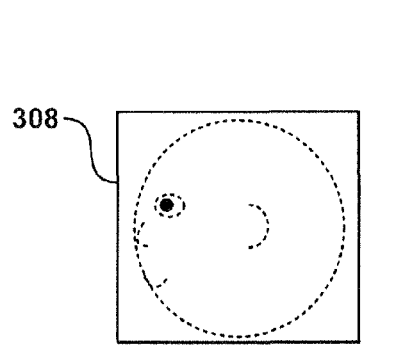

In at least some embodiments, the detection of a person's head can cause at least one orientation determining process to be activated, or at least trigger a portion of an active orientation determining process. In one example, a computing device can have at least one infrared (IR) emitter and receiver, or at least one IR transceiver (such as is shown subsequently in FIG. 6). As known in the art, the human eye reflects IR radiation differently than the rest of the human head, such that the position of a user's eyes can quickly be detected and/or located by analyzing a captured IR image. Such information can be used to help select at least one image of a person to be analyzed for facial recognition or other identification. For example, FIG. 3(b) illustrates an example wherein there would be one pupil detected in an area corresponding to the detected head position, such as may correspond to the user facing away from the device or being partially blocked by an occlusion. Accordingly, the detection of a single pupil can indicate to the device that a corresponding currently-captured frame of image information will likely not yield accurate results if analyzed. Thus, the device can wait for a time when the results will likely be more accurate. In at least some embodiments, since a user will likely only move so fast with respect to the device, a determination that certain features are not visible in the captured image information can cause a few frames or seconds of information to be skipped before again attempting to locate features, in order to conserve power and resources at times when the features will not likely be present.

Figure 3C:
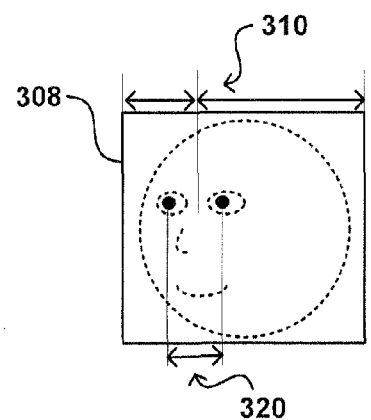

In FIG. 3(c), there could be two features detected in the reflected IR corresponding to the determined head position 308 that would likely correspond to two pupils of a person. In some embodiments, the presence of two pupils in the captured IR can be sufficient to cause a corresponding image to be selected for analysis. When two pupils are detected, the user may be facing sufficiently towards the camera a significant percentage of the time such that a device or application is configured to use an image when two pupils are present, with the knowledge that a percentage of these images will still not yield accurate results. A balance can be struck between the amount of processing to do for each image, and the percentage of times that additional images will need to be captured and analyzed.

In some embodiments, the mere presence of two pupil-like features corresponding to the detected head position might not be sufficient to select a corresponding image frame for processing. At least some embodiments also look to factors such as a relative position and/or separation of those features in the detected head position. For example, in FIG. 3(c) it can be seen that a center point between the pupil features 310 is substantially off center with respect to the detected head position 308. In at least some embodiments, a center point between the pupils must be within a given percentage (of the width of the determined head region 308) of distance from a center point of the head region for the image to be selected. In FIG. 3(c), the center position might be sufficiently away from the center of the head region for the image not to be selected for processing. Further, some processes can analyze the separation 320 between the pupil features to determine whether the person is looking substantially towards the image capture element. For typical persons, there is a range of pupil separation (as a percentage or fraction of head width) that will correspond to a person facing substantially towards the image capture element. In FIG. 3(c), the separation 320 between the pupil features is less than in FIG. 3(d), wherein the person is looking substantially toward the image capture element. Thus, while some embodiments would select an image corresponding to the timing of FIG. 3(c) due to the presence of two detected pupils, other embodiments might not select such an image due to at least the pupils being sufficiently off-center or having a separation indicating that the person is likely not looking substantially towards the image capture element.

Figure 3D:
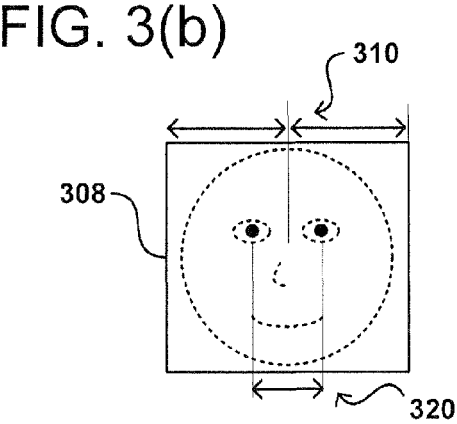

FIG. 3(d) illustrates an example situation wherein an image frame corresponding to a point in time might be selected in at least some embodiments. In this example, two features corresponding to pupil-like features are detected in the determined head region 308. The center point between the pupils 310 is near the center of the head region, and the separation between the features is within a range that is indicative of a user facing toward the image capture device. Accordingly, the analyzed IR data can cause the device to utilize an image frame being currently captured (assuming a sufficiently frequent capture rate) or captured at about the time of the IR analysis (assuming at least some buffering of the image or video information). Looking at dimensions relative to the detected head region can account for differences of scale between images, and simplify the determining process.

In embodiments where devices have more than one image capture element, a determination could be made using image information from multiple cameras to determine which camera the user is most facing, is closest to, etc. In other embodiments, the analyzed image information from a single image capture element can be utilized to attempt to determine the best image capture element to use for facial recognition. Once such a determination is made, the selected image capture element can be used to perform facial recognition for that person. Other advantages of multiple cameras can be utilized as well. For example, if the position of a user's head is being tracked, that tracking can be continuous across different camera views, for example, such that an additional detection or other such process need not be performed due to the image information being captured by different cameras.

In at least some embodiments, other aspects can be analyzed before selecting such an image. For example, some approaches might also look to a vertical position of the pupils with respect to the head region to determine whether the user is likely looking too far up or down in the image to produce accurate results. In other embodiments, the shape of the pupil information can be analyzed to determine whether the image will likely be in focus. For example, if the pupils do not have a well-defined edge in the reflected IR, it is likely that there was movement or another issue that could similarly prevent the captured image information from being in focus, Similarly, if the pupils do not have a substantially circular shape it can be indicative that there was motion or another issue that could prevent the image information from producing accurate results when analyzed. In some embodiments, multiple wavelengths can be used to ensure that the features actually correspond to a human eye, as will be discussed later herein in more detail. Approaches for determining the shape or other parameters of a person's eyes can be found, for example, in co-pending U.S. patent application Ser. No. 12/786,297, filed May 24, 2010, and entitled "Determining Relative Motion as Input," which is hereby incorporated herein by reference.

In other embodiments, a device might not have IR capability, or might utilize a method that does not consume as much power, as illuminating an area with IR radiation can require significant amounts of power for at least some devices. Even where an IR source is pulsed or otherwise timed to correspond with a detected head or head position, for example, the amount of power required can be more than desired in at least some situations.

Figure 4A:
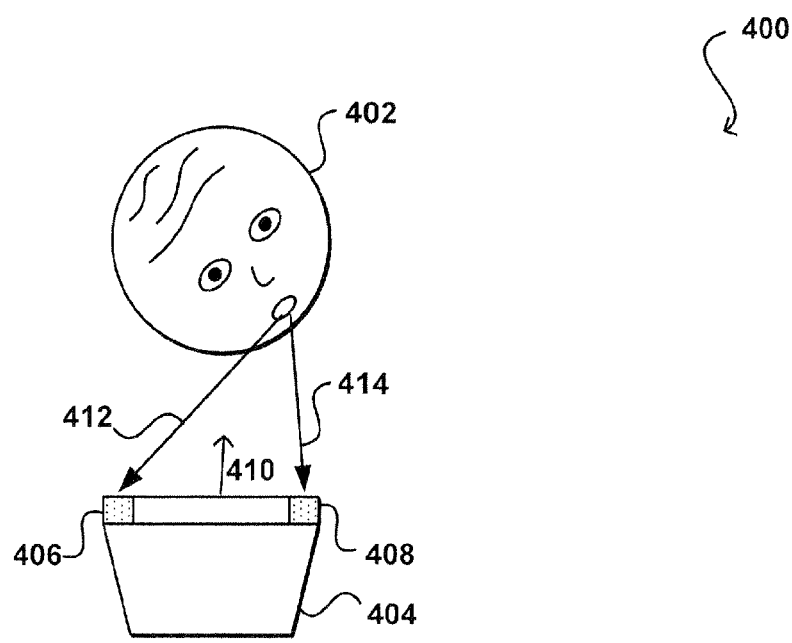
FIGS. 4(a) and (b) illustrate differences in audio path length to two microphones of a device based upon different relative head positions of a user as can be determined in accordance with various embodiments.

Accordingly, devices in accordance with certain embodiments can take advantage of other inputs, such as stereo microphones or multiple audio capture elements, to attempt to determine when a person is facing substantially towards the device. For example, FIG. 4(a) illustrates a situation 400 wherein a person 402 is facing at an angle with respect to an electronic device 404 while speaking. As known in the art, sound travels in a common medium (e.g., air) with a substantially constant velocity, such that audio capture elements at different distances from an audio source will capture the same audio at different times. Using approaches such as time of arrival determinations, the time difference between arrival of a common audio signal can be used to determine an approximate position, or at least direction, of the audio source. As can be seen in FIG. 4(a), when a person has his or her head tilted with respect to the device, or is otherwise positioned away from a center direction 410 in front of the device, the path length 414 to one of the audio capture elements 408 will be shorter than a path length 412 to another of the audio capture elements of the device electronic 404. A determination can be made, based upon audio produced by the person speaking or singing, for example, that the person is likely not in front of the device and facing the device, such that a corresponding image might not produce accurate processing results.

Figure 4B:
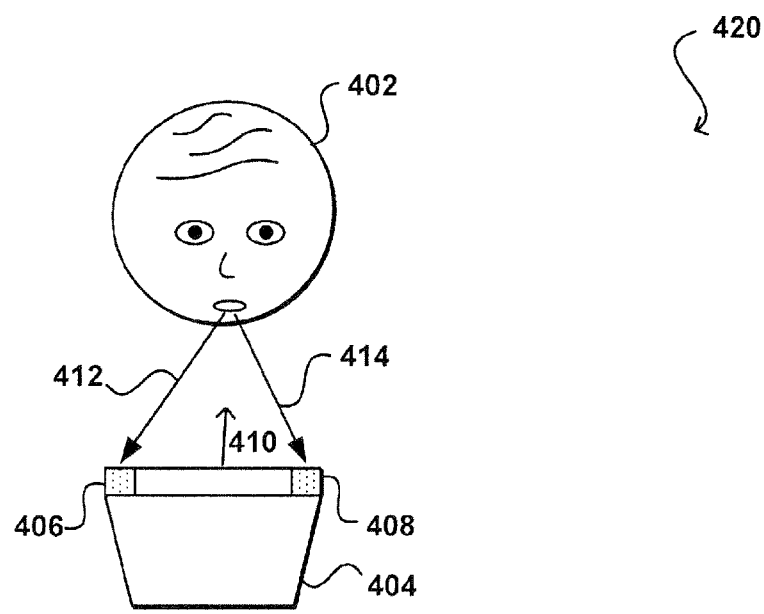

In FIG. 4(b), on the other hand, the path lengths 412, 414 are substantially equal, such that audio produced by the person is captured by the microphones 406, 408 at substantially the same time, indicating that the user is likely near the center direction 410 of the device and substantially facing the device. In at least some embodiments, such a determination can be sufficient to cause an image captured at substantially the same time to be selected for processing. In some embodiments, the determined direction of the audio source can be compared with the determined direction of the head position with respect to the device. For example, if a person's head is thirty degrees to the right of center in the viewable area of the camera, and the determined audio source is at approximately the same angle, the device can determine that the user is facing the device (though from an angle) enough that the person might be able to be recognized in the image using an appropriate algorithm. Various other approaches can be used as well in other embodiments.

Figure 5:
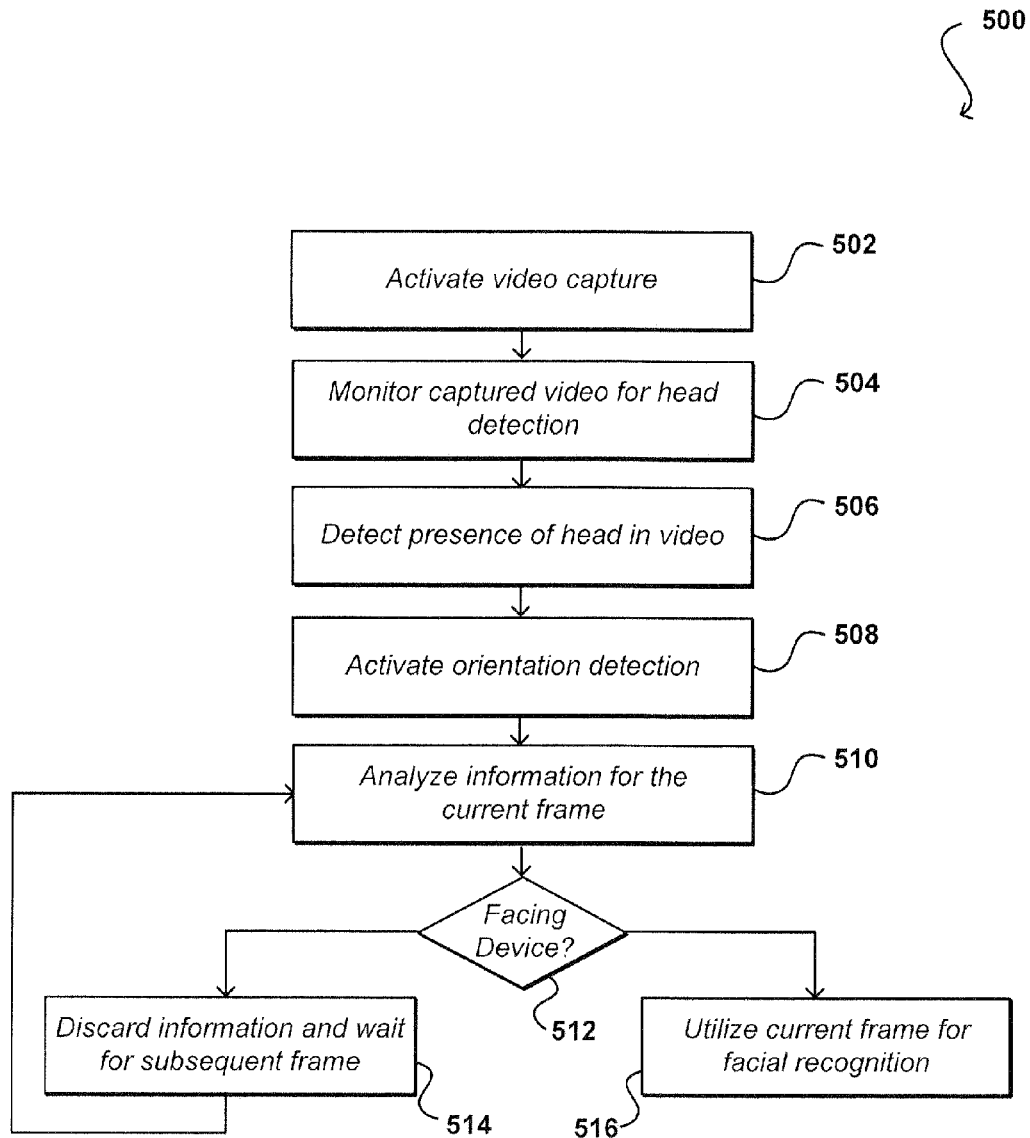
FIG. 5, illustrate an example process for selecting a video frame for facial recognition that can be used in accordance with various embodiments.

FIG. 5 illustrates an example of a process 500 that can be used to select a frame for processing in accordance with various embodiments. It should be understood, however, that there can be additional, fewer, or alternative steps performed in similar or alternative orders, or in parallel, within the scope of the various embodiments unless otherwise stated. In this example, video capture is activated on a device 502. As discussed elsewhere herein, the capture could be activated manually or automatically in response to a certain event or action, such as detecting motion, audio, or a type of heat signature near the device. In this example, the captured video stream can be monitored to detect the likely presence of a user's head or face using an appropriate detection algorithm 504. As discussed, in other examples head detection can be triggered in response to detecting pupils or audio, for example, or might not be used at all in certain embodiments where the analysis is based solely upon video capture and, for example, pupil detection, without the need to separately determine head position.

When the presence of a feature such as a person's head is detected in the captured video, an orientation detection process can be activated 506. As discussed, this can include triggering an infrared detection algorithm, analyzing captured audio, or monitoring for another such type of input. Such a process can attempt to determine when a person is in a relative orientation with respect to the computing device such that the person is determined to be substantially facing an image capture element of the device. Information from the orientation detection process then can be analyzed that corresponds to the current frame of video information 510. For IR detection, this can include determining whether one or more of the person's eyes appear in the captured IR image, as well as whether those eyes meet any size, shape, location, or separation criteria. For audio analysis, this can include determining a relative direction of the person while speaking. If it is determined that the user is substantially facing the device 512, at least within an allowable range of deviation, the current frame of video, or at least a frame corresponding to the time of orientation determination, can be selected for processing 516, such as for object or facial recognition. If it is determined that the user is not substantially facing the device within an acceptable deviation, or in the case where no determination can be made with an acceptable level of certainty, the information can be discarded (unless needed for other purposes) and the device can wait to analyze a subsequent frame 514, which then can undergo a similar portion of the process. In some embodiments, the analysis of orientation will occur with a certain frequency, such as to pulse the IR at no greater than a maximum frequency in order to conserve power on the device. Various other triggering approaches can be used as should be apparent in light of the teachings and suggestions contained herein.

Figure 6:
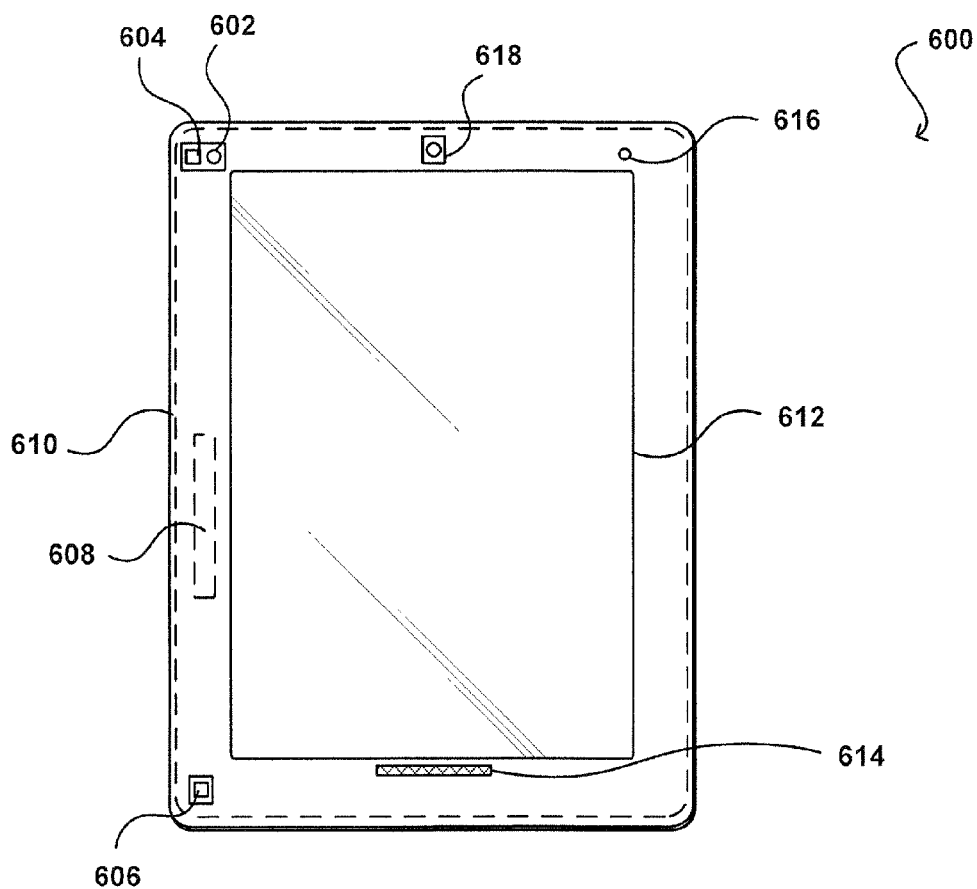
FIG. 6 illustrates an example device that can be used in accordance with various embodiments.

FIG. 6 illustrates an example of an electronic computing device 600 that can be used in accordance with various embodiments. As discussed, various other types of electronic devices can be used as well within the scope of the various embodiments. This example device includes a display element 612 for displaying information to a user as known in the art. The example device also includes at least one motion-determining element 608, such as an accelerometer or gyro element, which can be used to determine motion of the device, which can help to predict blur or focus of a captured image using various approaches described herein. The device also includes at least one image capture element for capturing image information about the user of the device. The imaging element may include, for example, a camera, a charge-coupled device (CCD), a motion detection sensor, or a radiation sensor, among many other possibilities. The example device in FIG. 6 includes a digital video camera 616 for capturing image information using ambient light as known in the art. The example device also includes an infrared (IR) emitter 602 and two IR detectors 604, 606 (although a single detector and two emitters could be used as well within the scope of the various embodiments). The IR emitter 602 can be configured to emit IR radiation, and each detector can detect the IR radiation reflected from a user (or other such surface or object). By offsetting the detectors in this example, each detector will detect radiation reflected at different angles.

In the example illustrated in FIG. 6, a first IR detector 604 is positioned substantially adjacent to the IR emitter 602 such that the first IR detector will be able to capture the infrared radiation that is reflected back from a surface, such as a viewer's retinas, in a direction that is substantially orthogonal to the capture plane of the detector. The second IR detector 606 is positioned a distance away from the IR emitter 602 such that the detector will only detect IR radiation reflected at an angle with respect to the orthogonal direction. When imaging a retro-reflector such as a user's retina, the second IR emitter will detect little to no reflected radiation due to the IR emitter, as the retina will not significantly reflect in the direction of the second emitter (although defects, particulates, or variations may deflect some of the radiation). As discussed later herein, this difference among images can be used to determine the position (and other aspects) of the retinas of a user, as the difference in IR reflection between the two images will be significant near the pupils or other such features, but the remainder of the images will be substantially similar.

In an alternative embodiment, a computing device utilizes a pair of IR emitters (e.g., IR light emitting diodes (LEDs), IR laser diodes, or other such components), to illuminate a user's face in a way that is not distracting (or even detectable) to the user, with the reflected light being captured by a single IR sensor. The LEDs are separated a sufficient distance such that the sensor will detect reflected radiation from a pupil when that radiation is emitted from the LED near the sensor, and will not detect reflected radiation from the pupil when that radiation is emitted from the LED positioned away from the sensor. The sensor can capture IR images that enable the device to analyze features of the user that reflect IR light, such as the pupils or teeth of a user. An algorithm can attempt to calculate a position in three-dimensional space (x, y, z) that corresponds to a location equidistant between the user's eyes, for example, and can use this position to track user movement and/or determine head motions. A similar approach can be used that utilizes a single IR emitting diode and a pair of IR sensors, as discussed above. Thus, the device can either direct IR from two locations or detect IR from two locations, with only one of those locations receiving retro-reflected radiation from a user's retinas. Other embodiments can utilize other approaches for performing head tracking, such as by requiring a user to wear glasses that emit IR radiation from a point source, etc.

In some embodiments it can be preferable to utilize a single emitter and two detectors when using single wavelength IR (e.g., 940 nm) in two directions, as using a single camera might be cheaper but also requires that images from the different directions be captured at different times. A downside to capturing images at different times is that movement during that period can affect the determination, even for capture frequencies on the order of 30 Hz (or 15 Hz for two cameras to get the same resolution). An advantage to a multi-camera system is that the images can be captured substantially simultaneously, such that movement between images is minimized. A potential downside to such an approach, however, is that there can be optical variations in the images due to the images being captured from two different points of view.

In one embodiment, a single detector can be used to detect radiation reflected at two different wavelengths. For example, a first LED could emit radiation at a wavelength (e.g., 940 nm) that is reflected by the retina, and a second LED could emit radiation at a wavelength (e.g., 1100 nm) that is absorbed by the cornea and/or other portions of the human eye. Specific wavelengths can be selected within selected wavelength ranges, based at least in part upon their reflective properties with respect to the human eye. For example, experiments indicate that light has less than a 50% absorption rate (for the typical human eye) under about 940 nm, above 50% absorption between about 940 nm and about 1030 nm, around 50% absorption for wavelengths between about 1040 nm and about 1100 nm, and about 100% absorption at 1150 nm and above. Thus, emitters can be selected that fall within at least some of these ranges, such as a first IR emitter that has significantly less that 50% absorption and a second IR emitter that has significantly greater than 50% absorption. The specific wavelengths can further be based, in at least some embodiments, upon the wavelengths of available devices. For example, an available laser diode at 904 nm can be selected that has a relatively low absorption rate, and an available laser diode at 980 nm or 1064 nm can be selected that has a relatively high absorption rate. In some embodiments, the power output of the higher wavelength diode can be scaled up to substantially match the perceived brightness of the lower wavelength diode by a CMOS sensor (or other such detector), the sensitivity of which might fall off to around zero at a value of about 1100 nm, such that in at least one embodiment the two emitters have wavelengths of 910 nm and 970 nm).

An advantage to using two wavelengths is that the LEDs can emit the radiation simultaneously, as long as a resulting image is able to be decomposed in order to extract image information corresponding to each wavelength. Various approaches for decomposing such an image are discussed elsewhere herein. The LEDs then could both be positioned near the camera, or a single LED or emitter can be used near the camera if that LED operates at (at least) the two frequencies of interest.

The emitter(s) and detector(s), and any ambient light camera(s) or other image capture element(s), can be positioned on the device in locations that are least likely to interfere with the user's operation of the device. For example, if it is determined that average users hold the device by the middle of either side of the device and primarily on the right side or on the bottom of the device, then the emitter and detectors can be positioned at the corners of the device, primarily on the left-hand side or top of the device. In another embodiment, there may be additional IR emitters (not shown) positioned on the device that transmit IR at different frequencies. By detecting which frequencies are received by the detectors, the device can determine specific information as to the orientation of the users gaze. Further discussion of using IR light to detect relative eye position can be found in co-pending U.S. patent application Ser. No. 12/786,297, filed May 24, 2010, and entitled "Determining Relative Motion as Input," which is hereby incorporated herein by reference for all purposes.

In some embodiments, it might be useful for a user to participate in a calibration process which accounts for aspects such as the strength of eye reflection from the user, as well as to determine dimensions, calibrate direction determinations, etc. Such an approach also can be useful if a user uses glasses that reduce the reflective capability, etc.

As discussed, other types of input can be provided as well for various purposes. For example, the device can include a touch- and/or pressure-sensitive element 610 around at least a portion of the device 600, such as on the back and/or sides of the device. Using such material, the device is able to determine whether a user is actively holding the device and/or can enable the user to apply input by squeezing at least a portion of the device. The input information could be used to enable the user to trigger a manual authentication, such as to perform a secure unlock of the device. The user can be facing substantially towards the device and squeeze, swipe, or otherwise provide input to a region on the device, at which time the device can determine, through the input, that the user is likely looking at the screen and can use a frame of recently- or subsequently-captured image information to process using a facial recognition or other such algorithm. The device can also determine, through use of the material, which portions of the device are likely covered by the hands of the user. In such an embodiment, multiple cameras and/or IR emitters may be positioned on the device at different locations, and based on where the user is holding the device (i.e., which IR emitters are covered vs. not covered), the system can determine which element(s) to use when capturing images.

The example device in FIG. 6 also includes a separate detection element 116, such as a motion sensor, heat signature detector, or light sensor. Such an element can provide input such as whether there is sufficient lighting for an image to be analyzed, as well as whether there is potentially a person in the room for purposes of activating an image capture or orientation-determining process. Further, a light-detecting sensor can help the device compensate for large adjustments in light or brightness, which can cause a user's pupils to dilate, etc. For example, when a user is operating a device in a dark room and someone turns on the light, the diameters of the user's pupils will change. As with the example above, if the device includes a display element that can operate in different modes, the device may also switch modes based on changes in the user's pupil dilation. In order for the device to not improperly interpret a change in separation between the device and user, the light detecting sensor might cause gaze tracking to be temporarily disabled until the user's eyes settle and a recalibration process is executed. Various other such approaches to compensate for light variations can be used as well within the scope of the various embodiments.

The example device 600 in FIG. 6 is shown to also include a microphone 614 or other such audio-capturing device. As illustrated in FIG. 4(*a*), for example, the device can include multiple audio capture elements that can be used to help determine a relative direction or location of an audio source in two or three dimensions. The device in at least some embodiments can also trigger various actions based upon sound detected by the microphone. For example, if the device detects speech from a person, the device might activate video capture to attempt to locate and/or identify the person speaking.

In the example configuration of FIG. 6, each imaging element 604, 606, 616 is on the same general side of the computing device as a display element, such that when a user is viewing the interface in the display element the imaging element has a viewable area that, according to this example, includes the face of the user. While in some embodiments the imaging element is fixed relative to the device, in other embodiments the imaging element can be operable to track the position of the user, such as by rotating the imaging element or an optical element (e.g., a lens, mirror, etc.) that directs light to the imaging element. In some embodiments, the device can include capture elements on the sides, back, or corners of the device, or in any other such location, which can capture image information in any appropriate direction around the device. In some embodiments, a device can concurrently image and identify multiple persons in different locations around the device, and track those persons over time using the various elements.

Figure 7:
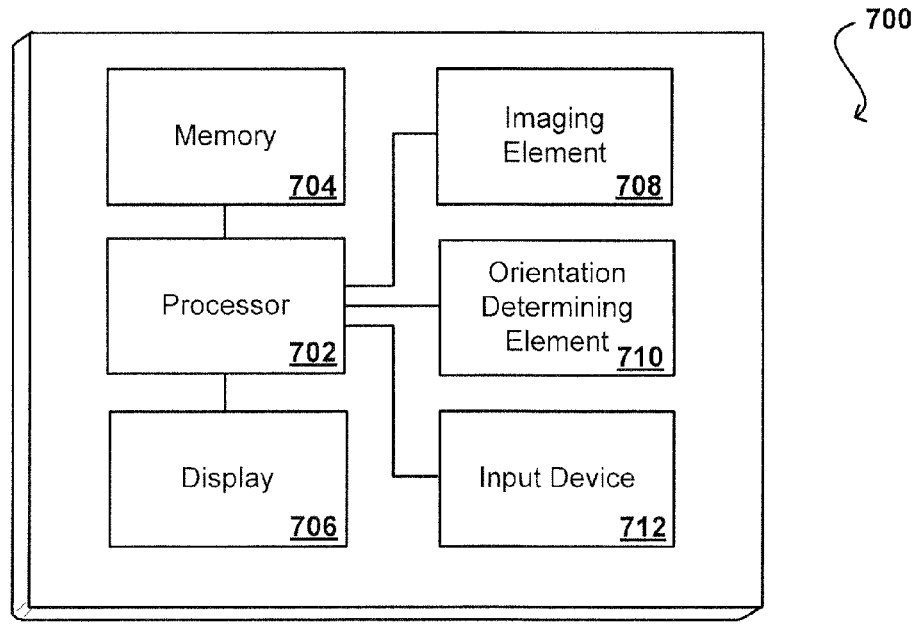
FIG. 7 illustrates an example set of components that can be utilized in a device such as that illustrated in FIG. 6.

FIG. 7 illustrates a set of basic components of an example computing device 700 such as the devices described with respect to FIG. 6. While a portable smart device is depicted in many examples herein, the computing device could be any appropriate device able to receive and process input commands, such as a personal computer, laptop computer, television set top box, cellular phone, PDA, electronic book reading device, video game system, or portable media player, among others. In this example, the device includes a processor 702 for executing instructions that can be stored in a memory device or element 704. As known in the art, the device can include many types of memory, data storage or computer-readable media, such as a first data storage for program instructions for execution by the processor 702, a separate storage for images or data, a removable memory for sharing information with other devices, etc. The device typically will include some type of display element 706, such as a liquid crystal display (LCD), although devices such as portable media players might convey information via other means, such as through audio speakers. As discussed, the device in many embodiments will include at least one imaging element 708 such as a camera, sensor, or detector that is able to image a facial region of a user. The imaging element can include any appropriate technology, such as a CCD imaging element having a sufficient resolution, focal range and viewable area to capture an image of the user when the user is operating the device. Methods for capturing images using an imaging element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application or other device.

In some embodiments, the device can include at least one orientation determining element 710 that is able to assist in selecting an appropriate image as discussed elsewhere herein. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. In some embodiments, the orientation-determining element can determine when the device is moving and is likely to produce a blurry image, and can prevent IR pulsing during this period in order to conserve power since the image information will likely not be useful based at least upon the motion of the device.

The device can include at least one additional input device 712 able to receive conventional input from a user. This conventional input can include, for example, a push button, touch pad, touch-sensitive element used with a display, wheel, joystick, keyboard, mouse, keypad or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device. As will be discussed later herein, functionality of these additional input devices can also be adjusted or controlled based at least in part upon the determined gaze direction of a user or other such information.

In some embodiments, one or more icons or other notifications might be displayed on the device to indicate to the user that IR illumination is active, or that image recognition is being performed. In some embodiments, a light (e.g., LED) on the device might illuminate in order to notify the user that facial recognition is activated in order to signal to the user that the user should look at the device and remain relatively still until the process can complete. Various other notifications can be used as well as appropriate.

A number of other approaches can be used as well within the scope of the various embodiments. For example, thermal imaging or another such approach could be used to attempt to determine and track the position of at least some aspect of a human user. In many instances the imaging system is desired to be small and cheap enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, can allow these relatively inexpensive cameras to be used as IR detectors.

Other conventional elements can be used to reduce the cost of a computing device able to perform approaches discussed herein, but might be less accurate and/or might require a larger device. For example, images can be split using beam splitters (e.g., silvered mirrors) such that half of the reflected light gets reflected to a different location (e.g., part of a sensor). Similarly, various optical elements such as an optical interferometer can be used to attempt to obtain accurate distance measurements.

Figure 8:
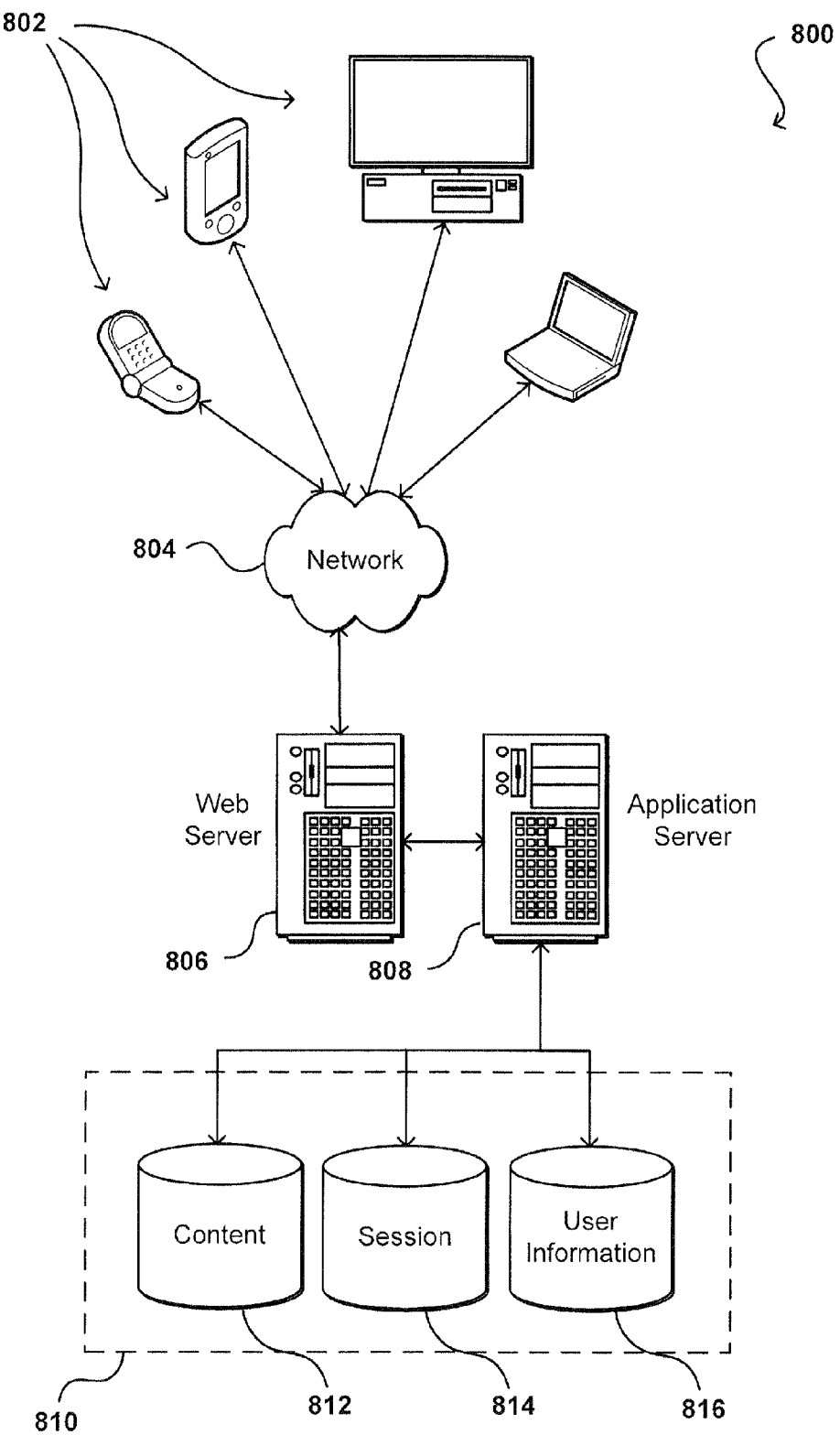
FIG. 8 illustrates an example an environment in which various embodiments can be implemented.

A computing device used for such purposes can operate in any appropriate environment for any appropriate purpose known in the art or subsequently developed. Further, various approaches discussed herein can be implemented in various environments for various applications or uses. Portions of the analysis also can be sent or offloaded to remote devices which might have more available resources and/or capacity. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The environment 800 shown includes a variety of electronic client devices 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic hook readers, and the like. Each client device can be capable of running at least one motion or orientation-controlled interface as discussed or suggested herein. In some cases, all the functionality for the interface will be generated on the device. In other embodiments, at least some of the functionality or content will be generated in response to instructions or information received from over at least one network 804.

The network 804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof In this example, the network includes the Internet, as the environment includes a primary content provider 806 and a supplemental content provider 808. Each provider can include at least one Web server 806 for receiving requests from a user device 802 and serving content in response thereto, although for other networks an alternative device serving a similar purpose could be used as would be apparent to one of ordinary skill in the art.

Each content provider in this illustrative environment includes at least one application server 812, 814, 822 or other such server in communication with at least one data store 816, 818, 824. It should be understood that there can be several application servers, layers, and/or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. An application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 802 and an application server, can be handled by the respective Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, the page data store 816 illustrated includes mechanisms for storing page data useful for generating Web pages and the user information data store 818 includes information useful for selecting and/or customizing the Web pages for the user. It should be understood that there can be many other aspects that may need to be stored in a data store, such as access right information, which can be stored in any of the above listed mechanisms as appropriate or in additional mechanisms in the data store. Each data store is operable, through logic associated therewith, to receive instructions from a respective application server and obtain, update, or otherwise process data in response thereto. In one example, a user might submit a search request for a certain type of content. In this case, the data store might access the user information to verify the identity of the user, and can access the content information to obtain information about instances of that type of content. The information then can be returned to the user, such as in a results listing on a Web page that the user is able to view via a browser on the user device 802. Information for a particular instance of content can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of selecting at least one image frame for facial recognition, comprising:
    under the control of an electronic device comprising at least one infrared (IR) imaging mechanism and configured with executable instructions,
    detecting at least one feature in at least one image, the feature being indicative of a person's head;
    activating the at least one IR imaging mechanism of the electronic device operable to emit IR light;
    detecting features corresponding to pupils in reflected IR light;
    analyzing the detected features to determine at least one attribute of the detected features in the reflected IR light; and
    selecting a frame of the at least one image when at least one attribute of the detected features meets a specified criterion.

2. The computer-implemented method of claim 1, further comprising determining that detected IR reflections are indicative of the detected features corresponding to human eyes.

3. The computer-implemented method of claim 2, further comprising:
    determining an amount of separation between the human eyes; and
    analyzing the separation between the human eyes to determine whether a person is looking towards the electronic device.

4. The computer-implemented method of claim 3, further comprising:
    determining that the person is looking towards the electronic device; and
    selecting the frame of the at least one image.

5. The computer-implemented method of claim 1, the at least one IR imaging mechanism operable to emit pulses of IR light at a specified frequency of emission.

6. The computer-implemented method of claim 1, further comprising:
    detecting motion near the electronic device before initiating a capture of the at least one image.

7. The computer-implemented method of claim 1, further comprising:
    detecting at least one feature from supplemental information indicative of a person's head.

8. The computer-implemented method of claim 1, wherein the specified criterion includes a threshold amount of lighting or contrast in the frame of the at least one image, positions of the detected features relative to the person's head, or sizes and shapes of the detected features.

9. A computer-implemented method of selecting at least one image frame for facial recognition, comprising:
under the control of an electronic device comprising at least one infrared (IR) imaging mechanism and configured with executable instructions,
detecting at least one feature in image data, the feature being indicative of a person's head;
activating the at least one IR imaging mechanism of the electronic device operable to emit IR light;
detecting features corresponding to a person's corneas in reflected IR light;
initiating a capture of at least one image on the electronic device; and
selecting a frame of the at least one image based on a specified selection criterion.

10. The computer-implemented method of claim 9, further comprising determining that detected IR reflections are indicative of the detected features corresponding to human eyes.

11. The computer-implemented method of claim 10, further comprising:
determining an amount of separation between the human eyes; and
analyzing the separation between the human eyes to determine whether a person is looking towards the electronic device.

12. The computer-implemented method of claim 11, further comprising:
determining that the person is looking towards the electronic device; and
selecting the frame of the at least one image.

13. The computer-implemented method of claim 10, further comprising:
detecting at least one feature from supplemental information indicative of a person's head.

14. The computer-implemented method of claim 9, the at least one IR imaging mechanism operable to emit pulses of IR light at a specified frequency of emission.

15. The computer-implemented method of claim 9, further comprising:
detecting motion near the electronic device before initiating a capture of the at least one image.

16. A computer system, comprising:
one or more processors;
a memory device including instructions that, when executed by the one or more processors, cause the computing system to:
detecting at least one feature in at least one image frame, the feature being indicative of a person's head;
activate at least on infrared (IR) imaging mechanism of an electronic device operable to illuminate a person with at least one wavelength of IR light and detect IR light reflected back from the person;
detect features corresponding to the person in the reflected IR light; and
select a frame of the at least one image when the detected features meet a specified selection criterion.

17. The computer system of claim 16, wherein the memory device further includes instructions that determine that the detected IR reflections are indicative of the detected features corresponding to human eyes.

18. The computer system of claim 17, wherein the memory device further includes instructions that:
determine an amount of separation between the human eyes; and
analyze the separation between the human eyes to determine whether the person is looking towards the electronic device.

19. The computer system of claim 18, wherein the memory device further includes instructions that:
determine that the person is looking towards the electronic device; and
select the frame of the at least one image.

20. The computer system of claim 16, wherein the memory device further includes instructions that:
detect motion near the electronic device before initiating a capture of the at least one image.

21. The computer system of claim 16, wherein the memory device further includes instructions that:
detect at least one feature from supplemental information indicative of a person's head.

* * * * *